(12) United States Patent
Ganev et al.

(10) Patent No.: US 7,986,057 B2
(45) Date of Patent: Jul. 26, 2011

(54) METHOD AND SYSTEM FOR IMPROVING PEAK POWER CAPABILITY OF AN AIRCRAFT

(75) Inventors: Evgeni Ganev, Torrance, CA (US);
Bulent Sarlioglu, Torrance, CA (US);
William Warr, Glendale, CA (US)

(73) Assignee: Honeywell International Inc., Morristown, NJ (US)

( * ) Notice: Subject to any disclaimer, the term of this patent is extended or adjusted under 35 U.S.C. 154(b) by 416 days.

(21) Appl. No.: 12/211,766

(22) Filed: Sep. 16, 2008

(65) Prior Publication Data
US 2010/0066165 A1    Mar. 18, 2010

(51) Int. Cl.
*H02J 3/00* (2006.01)
(52) U.S. Cl. .................. 307/45; 307/68; 307/84
(58) Field of Classification Search .......... 307/45, 307/68, 84
See application file for complete search history.

(56) References Cited

U.S. PATENT DOCUMENTS

| 5,283,470 | A | 2/1994 | Hadley et al. |
| 2006/0061922 | A1 | 3/2006 | Mihai et al. |
| 2007/0159007 | A1 | 7/2007 | King et al. |
| 2009/0224599 | A1* | 9/2009 | Yue et al. .............. 307/9.1 |

FOREIGN PATENT DOCUMENTS
EP    0399146 A1    11/1990

OTHER PUBLICATIONS
Industrial Rectifier Brochure, DB-RI-01, Rev 0, Apr. 1999.
* cited by examiner

*Primary Examiner* — Jared J Fureman
*Assistant Examiner* — Hal I Kaplan
(74) *Attorney, Agent, or Firm* — Miriam Jackson, Esq.

(57) ABSTRACT

A method and system for improving peak power capability in an electrical system is disclosed. The system may include an auxiliary generator operated in conjunction with one or more main engine generators during the need for increased transient load demands. The system may include a main engine generator, an auxiliary generator, an inverter/converter controller (ICC) connected to respective generators, a semi-conductor power device connected between the ICCs, and a main bus between the semi-conductor power device and a load.

17 Claims, 6 Drawing Sheets

METHOD AND SYSTEM FOR IMPROVING PEAK POWER CAPABILITY OF AN AIRCRAFT

BACKGROUND OF THE INVENTION

The present invention relates generally to the field of electrical systems, and more particularly, to aircraft power systems.

Improving peak power capability of an aircraft has garnered attention by some to become an important aspect for future electric power systems of the aircraft. The introduction of electromechanical actuation (EMA) and electrohydrostatic actuation (EHA) into aircraft systems were contributors to increased peak power demand.

Power electronics for aerospace applications may play a significant role in the modern aircraft and spacecraft industry. This may be particularly true in the area of more-electric architecture (MEA) for aircraft and military ground vehicles. Some aircraft already utilize MEA, including primary and secondary flight control. These aircraft may have electrical loads with substantial power demands that may be transient in nature. The transients may typically last less than a second and have a repetition rate in the range of a fraction of a Hertz. Regeneration transients may also play a role in more-electric architecture for aircraft.

Figure 1:
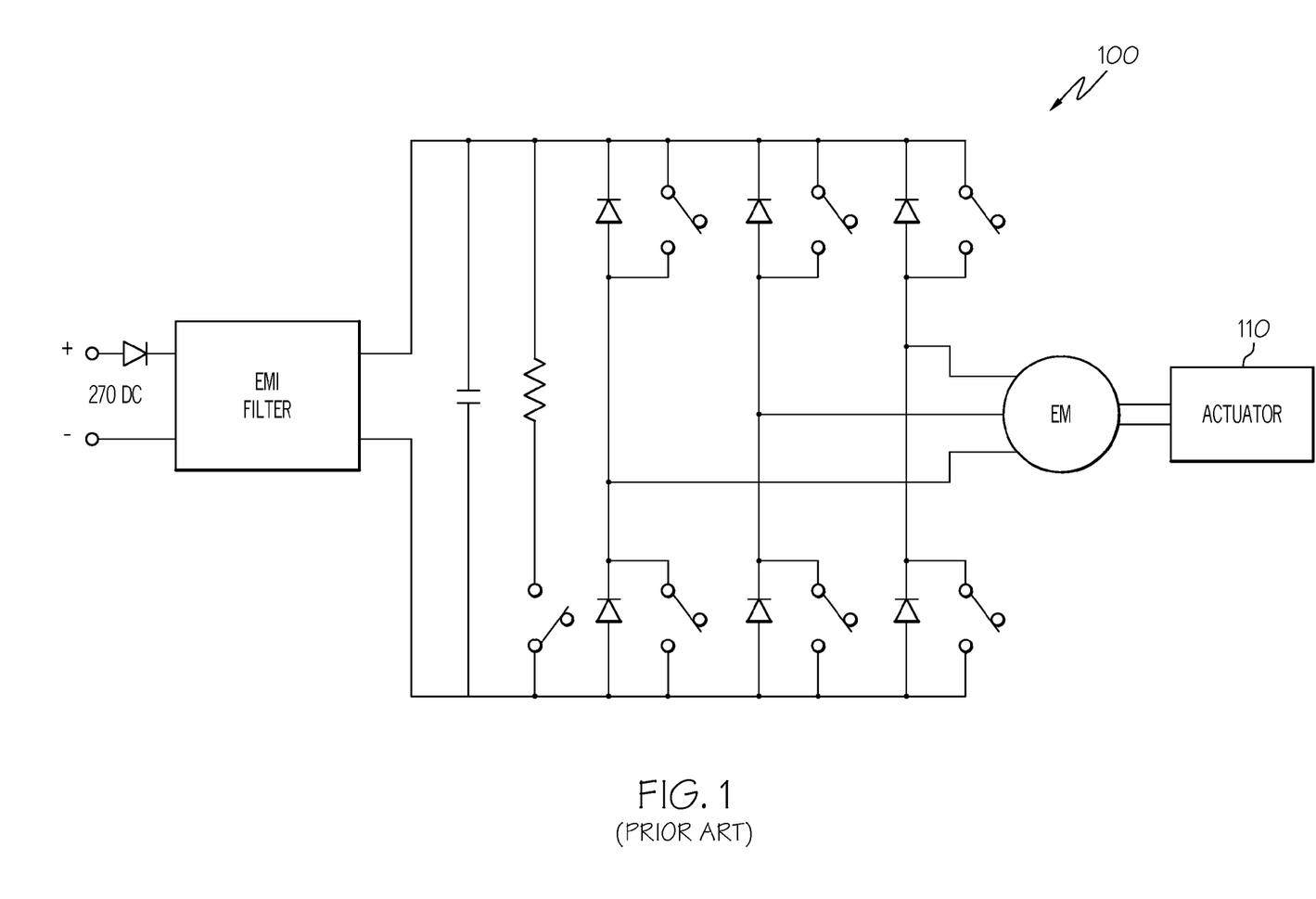
FIG. 1 is a schematic of a prior art circuit.

Electrical loads, such as electromechanical and electrohydrostatic flight control actuators, can demand high peak power, potentially driving the size of an aircraft's electrical power generation and distribution systems. FIG. 1 represents a power topology 100 of an electrically driven actuator known in the art. The mechanical demand of an actuator 110 may result in a high-amplitude, short-duration power/current exchange between the actuator control power electronics and the dc supply bus. This power/current exchange may also be bi-directional.

One approach to solve these power requirements has been to increase the peak power rating of the generation systems without changing the functionality.

However, such exemplary approaches may suffer when trying to satisfy peak demand by unduly increasing the size of the electrical generator. Increasing the peak power rating of the generation system under some approaches may include increased power electronic components. For example, in some cases, larger semiconductor devices and magnetic components may be required. Thus, the power electronics used for conditioning the raw power from the generator to a regulated power may be penalized as well.

Other approaches may store additional peak power in specially designed devices such as batteries, super capacitors, or flywheels. However, substantial penalties may be paid in the areas of reliability, weight, volume, and cost due to the substantial increase in complexity of added components.

As can be seen, there is a need for a method and a system to improve aircraft peak power capability.

SUMMARY OF THE INVENTION

In one aspect of the present invention, an electrical system comprises a first main engine generator for providing steady state and transient power; a first inverter/converter controller connected to the first main engine generator for converting power from the first main engine generator; a first load for receiving the first main engine generator power; an auxiliary generator activated for parallel operation in connection with the first main engine generator during transient power demands from the electrical system, the auxiliary generator providing a supplemental power to the electrical system; and a supplemental inverter/converter controller connected to the auxiliary generator for converting the supplemental power into a supplemental current and for supplying the supplemental current to augment the first main engine generator power.

In another aspect of the present invention, an electrical system comprises a plurality of main engine generators operating independently of one another for providing steady state and transient power; a plurality of inverter/converter controllers connected respectively to the plurality of main engine generators for converting power from respective main engine generators; a plurality of loads for receiving respective main engine generator power and for providing a regeneration current back to respective main engine generators; an auxiliary generator activated for parallel operation in connection with the main engine generators, the auxiliary generator providing a supplemental power to the electrical system; a supplemental inverter/converter controller connected to the auxiliary generator for converting the supplemental power into a supplemental current and for supplying the supplemental current to augment respective main engine generator power; and a plurality of electrical gates connected between the supplemental inverter/converter controller and respective plurality of loads for controlling a flow of the regenerated current.

In a further aspect of the present invention, a method of providing increased peak power capability in an electrical system of a machine, comprises the steps of checking the electrical system for increases in motoring of the machine; checking for increased power demands in the electrical system during an increase in motoring; checking for insufficient power transferred to a first load during the increased power demand; activating an auxiliary generator to operate in parallel with a first main generator engine wherein the first main engine generator is connected to a first inverter/converter controller for converting a first main engine generator power into a first main engine power for transfer to the first load; transferring a supplemental power from the auxiliary generator to a supplemental inverter/converter controller; converting the supplemental power into a supplemental current for transfer to the first load; transferring the supplemental current to a main bus for supplementing the main generator engine power to meet the increased power demand; transferring the supplemented main engine generator power to the first load.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below The electrical system of the present invention is described for exemplary use in improving the peak power capability for aircraft electrical systems. One exemplary embodiment comprises a system including main generator sources and an auxiliary generator source, for providing and controlling power to ancillary and actuation loads for use in aerospace applications. The auxiliary generator may be used to generate power in a power and thermal management system or as a separate auxiliary power unit.

The electrical system of the present invention may employ the operation of a main generator source and an auxiliary generator source during transient load demands on the system. Unlike prior art electrical systems which may rely on devices such as batteries and capacitors, the present invention may include an auxiliary generator to supplement peak power demands on the main generators as needed.

Figure 2:
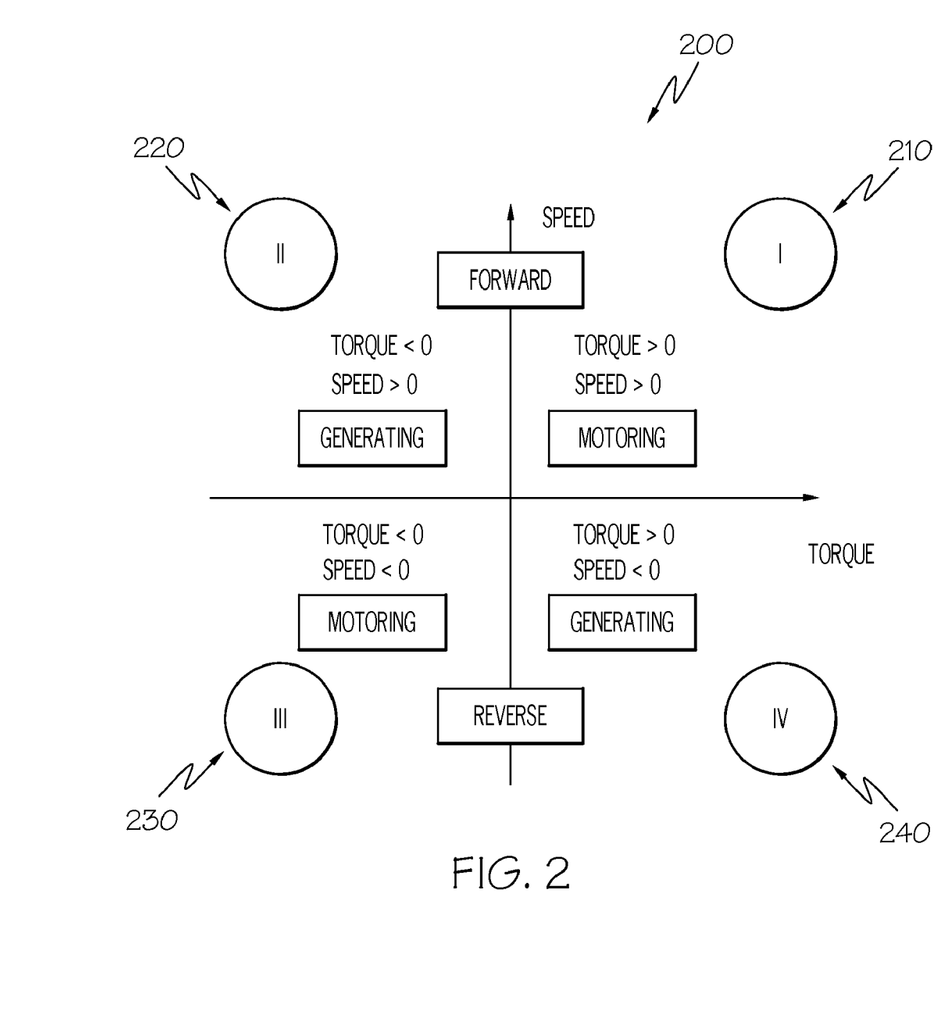
FIG. 2 is an illustration of an operation in accordance with the principles of the present invention.

A diagram of a surface control actuator four-quadrant operation 200 is shown in FIG. 2. Large current spikes from a power source (not shown) may be required for vehicle surface control actuators (not shown) when operating in quadrants I (210) and III (230) while motoring. Large current spikes are regenerated when operating in quadrants II (220) and IV (240) when the system 200 is generating. An electrical system of the present invention may supply the power needed to supply the current spikes during both motoring and generating.

Figure 3:
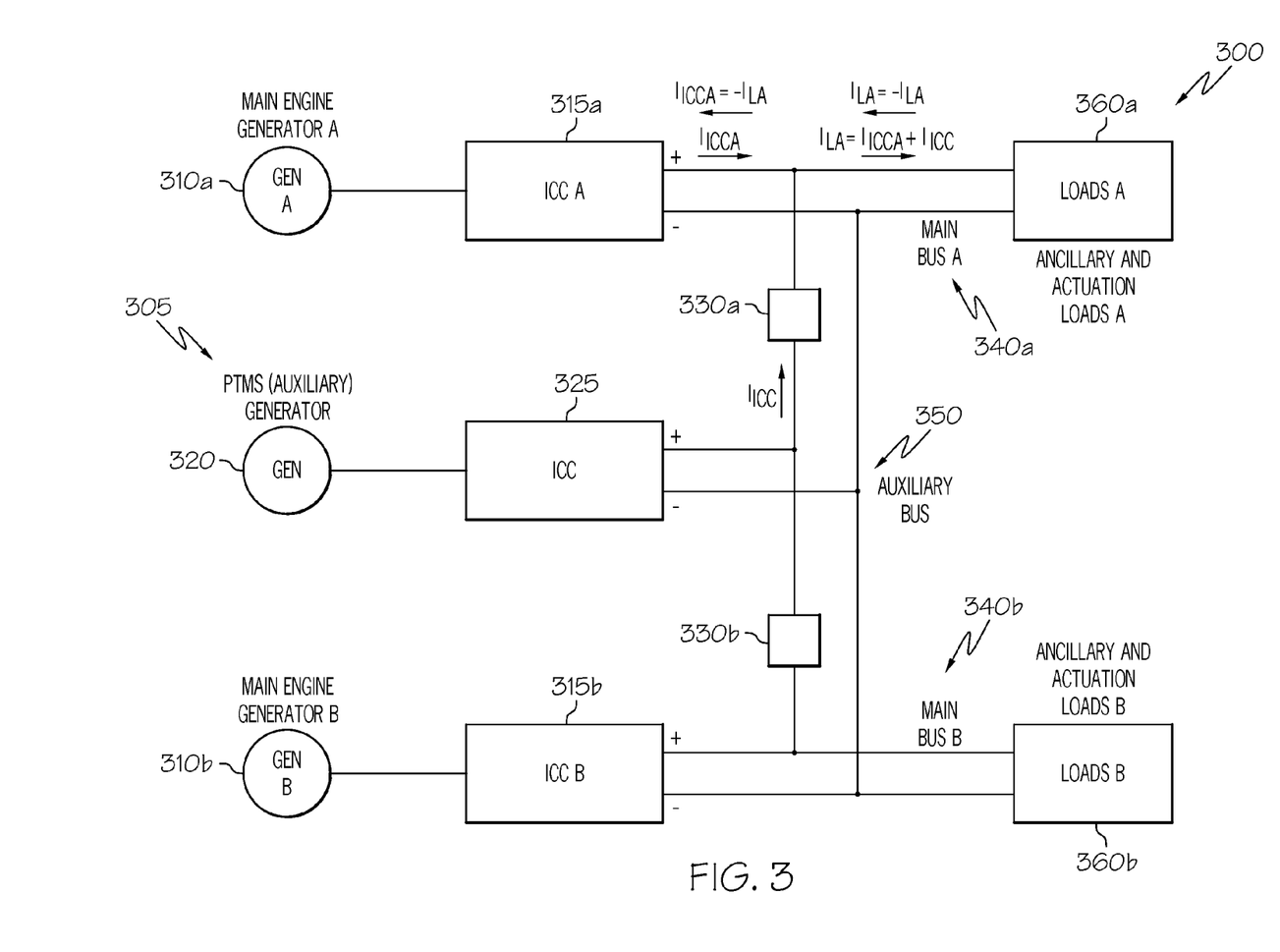
FIG. 3 is an illustration of a system in accordance with the principles of the present invention.

FIG. 3 illustrates an exemplary embodiment of an electrical system 300 including two main engine generators 310a and 310b and one auxiliary generator 320. The auxiliary generator 320 may be a sub-component of, for example, a power and thermal management system (PTMS) 305. Each generator 310a, 310b may be connected to its own inverter/converter controller (ICC) unit 315a, 315b, respectively to regulate a dc main bus A 340a or dc main bus B 340b during generation and to achieve motoring to start up engines (not shown). Similarly, the auxiliary generator 320 may be connected to its own supplemental inverter/converter controller 325. The loads 360a and 360b in the dc main busses A (340a) and B (340b) respectively may be categorized as ancillary and actuator loads. Actuator loads may represent the loads that may need peak power and can regenerate into the bus, whereas ancillary loads may represent relatively steady loads that do not regenerate. The power generated by the auxiliary generator 320 may be connected via electrical gates 330a and 330b to each of the dc main busses A (340a) and B (340b) powered by the main engine generators 310a and 310b and their respective ICC's 315a and 315b. In one exemplary embodiment, the role of electrical gates 330a and 330b may be employed by power semiconductor devices. Exemplary signal interfaces among the ICC's 315a and 315b can be achieved via communication busses (not shown) such as CAN and RS-422 models.

In operation, the auxiliary generator 320 may be idle and both main engine generators 310a and 310b may provide steady state and transient power to the loads 360a and 360b independently of each other. When large transient power may be required by actuator loads, the overall power need may exceed the capability of the main generators 310a and 310b. The system 300, in response to a need for more transient power, may enable the auxiliary generator 320 to provide the additional peak power. In one exemplary embodiment, the electrical gates 330a and 330b may be diodes forming a uni-directional electrical connection between any combination of the main generators 310a, 310b, or auxiliary generator 320. In a case where the electrical gates 330a and 330b are diodes, the diodes may allow an additional peak current to be supplied from more than one source. It will be understood that the following description will focus on one main engine generator (310a) for ease of illustration, however, the following operation may be run concurrently with both main engine generators (310a; 310b) in operation. For example, during generating of an electrical machine (not shown), the main engine generator 310a may be deficient in supplying enough power to the load 360a. The main engine generator 310a may supply power to the ICCA 315a. In turn, the ICCA 315a may supply a main engine generator current $I_{CCA}$ to the load 360a. When load 360a demands increased power beyond the capability of the main generator engine 310a and ICCA 315a, the auxiliary generator 320 may supply a supplemental power load to the ICC 325 for conversion into a supplemental current $I_{CC}$. The ICC supplemental 325 transfers the supplemental current $I_{CC}$ to the auxiliary bus 350 and power device (diode) 330a. The diode may conduct power from the auxiliary bus 350 to the dc main bus A 340a. Thus, a supplemented main engine current $I_{LA}$ may be supplied to the load 360a comprising the main engine generator current $I_{CCA}$ and the supplemental current $I_{CC}$.

Figure 4:
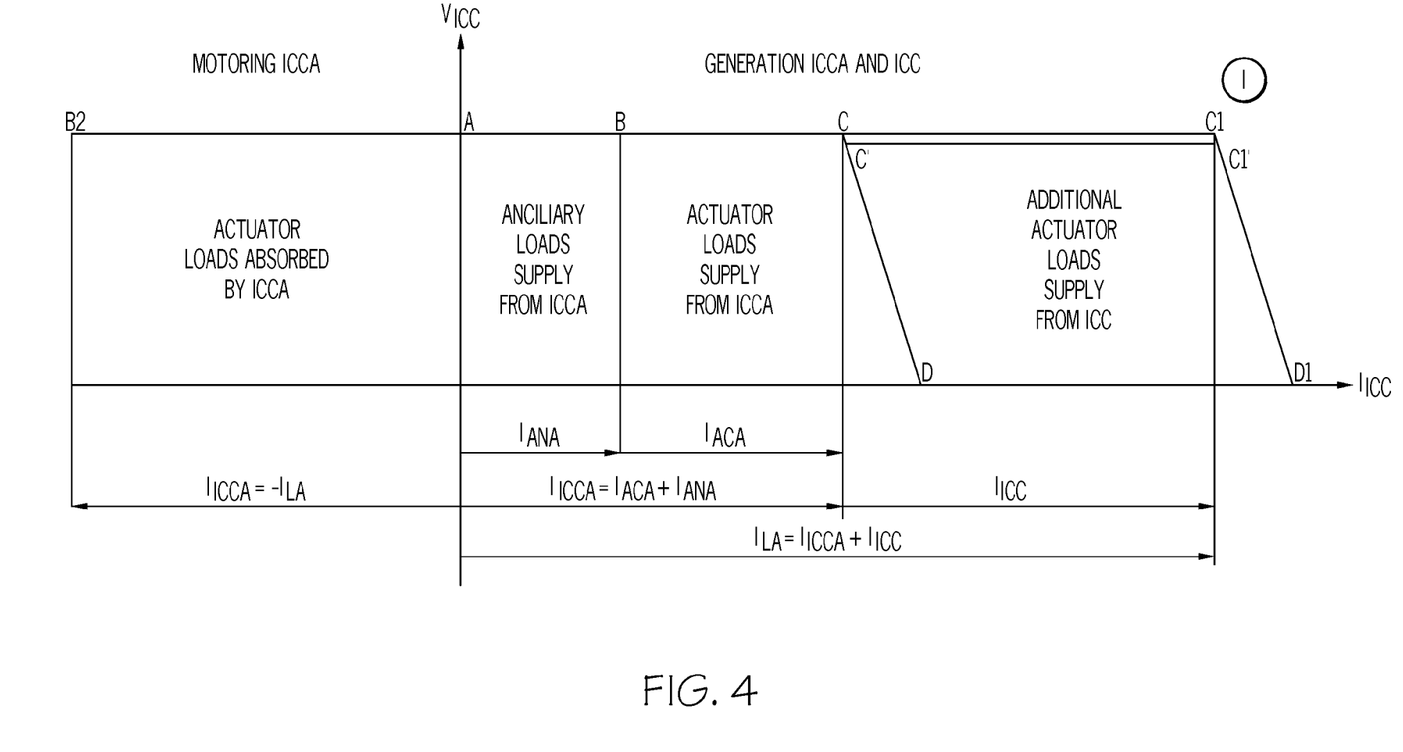
FIG. 4 is graphic representation of loading characteristics in accordance with the principles of the present invention.

FIG. 4 may illustrate exemplary loading characteristics of supplemental ICC 325 and ICCA 315a at different operating modes during parallel operation of main generator 310a and auxiliary generator 320. While the auxiliary generator 320 and its supplemental ICC 325 may operate in quadrant I (210), the main engine generators 310a and 310b and their respective ICC's 315a and 315b may operate in both quadrant I (210) and quadrant II (220). The nominal rating of the main generator (310a or 310b) may be equal to the loads 360a and 360b in each dc main bus 340a or 340b at steady state. The rating of the auxiliary generator 320 can also be made as high as the loads in each dc main bus A 340a and B 340b at steady state in case of main engine generation failure. The electromechanical and electrohydrostatic flight control actuators (not shown) on a single dc main bus A 340a or B 340b may regenerate transient power up to the transient capabilities of the main generator 310a or ICCA 315a for main bus 340a and up to the transient capabilities of the main generator 310b or ICCB 315b for main bus 340b. In case of failure in the main generators (310a; 310b) or the ICCA 315a or ICCB 315b, the dc main bus (340a; 340b) can regenerate up to the transient capability of the auxiliary generator 320 or supplemental ICC 325 if bi-directional power flow capability between auxiliary generator 320 and appropriate main bus (340a; 340b) is implemented.

Thus, the peak power capability of a single dc main bus (340a; 340b) can be as large as the combined transient capability of one main generator (310a; 310b) plus the PTMS generator 320. In FIG. 4, an example loading characteristic of main generator 310a, ICCA 315a and supplemental ICC 325 is shown. ICCA 315a may provide the power to relatively steady ancillary loads while it regulates the constant voltage between point A and point B. The ICCA 315a may be designed such that it also has capability to supply power to the more dynamic actuator load and may continue to regulate the voltage at a constant level between point B and point C. The supplemental ICC 325 may supply power to an actuation load during peak demand and regulate a constant voltage between point C and point C1. While the supplemental ICC 325 operates between point C and point C1, the operating point of the ICCA 315a may remain at point C'. While the supplemental ICC 325 operates between point C and point C1, the voltage across load 360a remains slightly lower due to the voltage drop of diode 330a. Overloading of ICCA 315a and supplemental ICC 325 may be important considerations for the protection capability of the overall system 300. During an overload scenario or short circuit event at the load 360a, the output of the supplemental ICC 325 and ICCA 315a may follow the curve C1'-D1 and C'-D, respectively. It will be understood that the current sharing may be achieved between the supplemental ICC 325 and ICCA 315a during an overload condition by moving the C'-C1' line in parallel to the X axis representing $I_{ICC}$. Peak power absorption capability can be achieved by operating the ICCA 315a in quadrant II (120 of FIG. 2). The voltage is regulated between point A and point B2 during regeneration by the ICCA 315a or the source of the peak power.

The system total load supply may be determined by the sum of the ICC 325 and ICCA 315a ratings when the rating of main engine generator 310a may be equal or larger than the rating of ICCA 315a and the rating of the auxiliary generator 320 is equal or larger than the rating of the supplemental ICC 325. For example, if supplemental ICC 325 and ICCA 315a are rated to be equal, the total power/current available to the load 360a may be doubled as is the peak power/current capability to load 360b. It will be understood that in the system 300, the ICC 325 can supply additional peak power to both loads 360a and 360b simultaneously.

Figure 5:
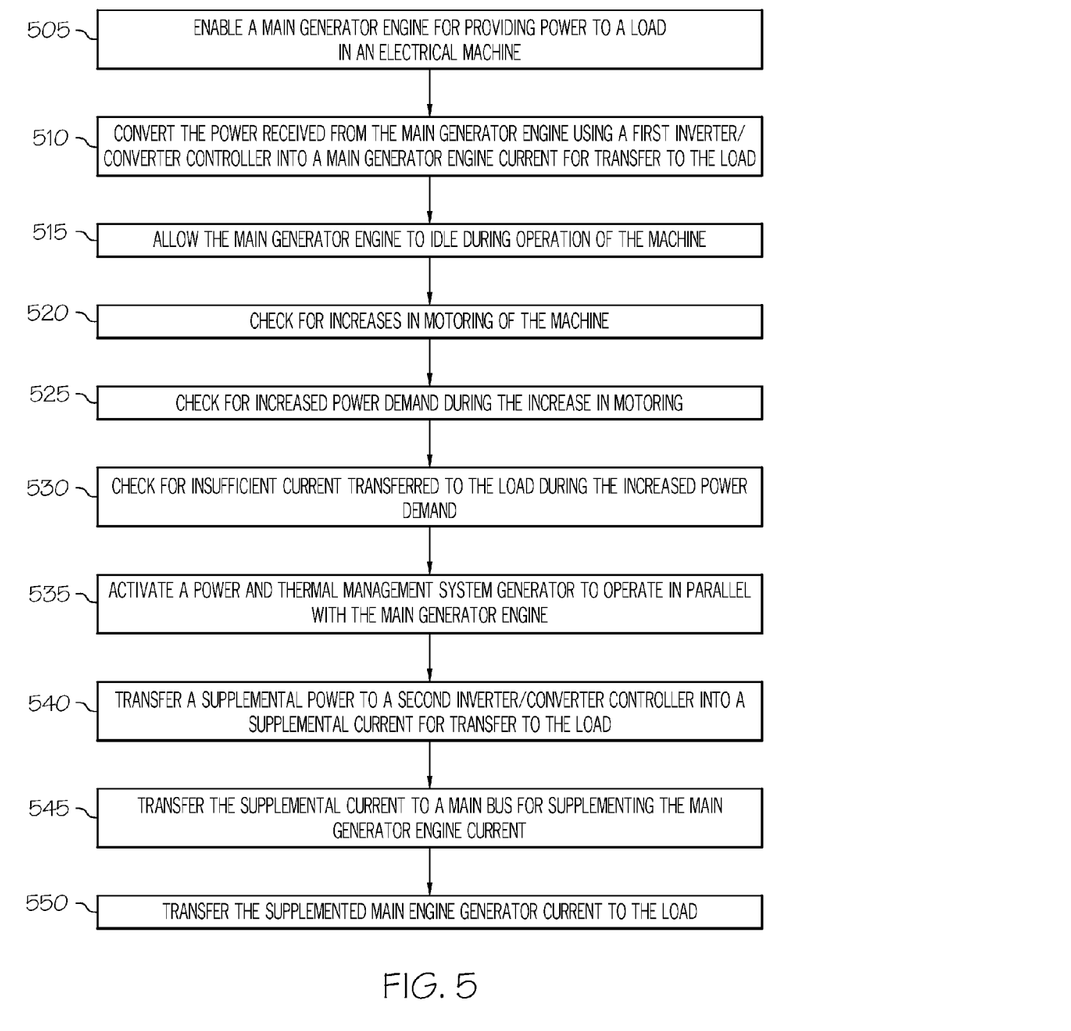
FIG. 5 is a flow chart illustrating a series of steps in a method according to one exemplary embodiment of the present invention.

FIG. 5 illustrates a series of steps in an exemplary method according to the present invention. In block 505, a main generator engine may be enabled for providing power to a load in an electrical machine. In block 510, the power received from the main generator engine may be converted using a first inverter/converter controller into a main generator engine current for transfer to the load. In block 515, the main generator engine may be allowed to idle during operation of the machine. In block 520, an increase in motoring of the machine may be checked for. In block 525, an increase in power demand may be checked for during the increase in motoring. In block 530, a check for insufficient current transferred to the load during the increased power demand may be performed. In block 535, a power and thermal management system generator may be activated to operate in parallel with the main generator engine. In block 540, a supplemental power may be transferred to a second inverter/converter controller into a supplemental current for transfer to the load. In block 545, the supplemental current may be transferred to a main bus for supplementing the main generator engine current. In block 550, the supplemented main engine generator current may be transferred to the load.

It will be understood that while the foregoing was described in the context of providing a generation, in another exemplary embodiment, the system 300 may also provide for regeneration. Referring back to FIG. 3 for example, during regeneration of actuator loads, both main engine generators 310a and 310b may be used to absorb the regenerated power independently of each other. A system 300 may enhance regeneration by employing electrical gates 330a and 330b as bi-directional semi-conductor power devices. The bi-directional semi-conductor power devices may perform switching functions allowing current to pass back and forth between any two generators (310a, 310b, or 320) as needed depending on peak power demand. It will be understood that the switching function may be controlled by a control system (not shown).

In one exemplary embodiment, the bi-directional power devices may allow regenerated current ($-I_{LA}$) to flow back from a load 360a. The regenerated current ($-I_{LA}$) may flow back through the ICCA 315a and into either the main engine generator 310a or it may bypass the engine generator 310a and the auxiliary generator 320 and flow through the bi-directional power devices (electrical gates) 330a and 330b and auxiliary bus 350 into the main generator 310b as desired.

Figure 6:
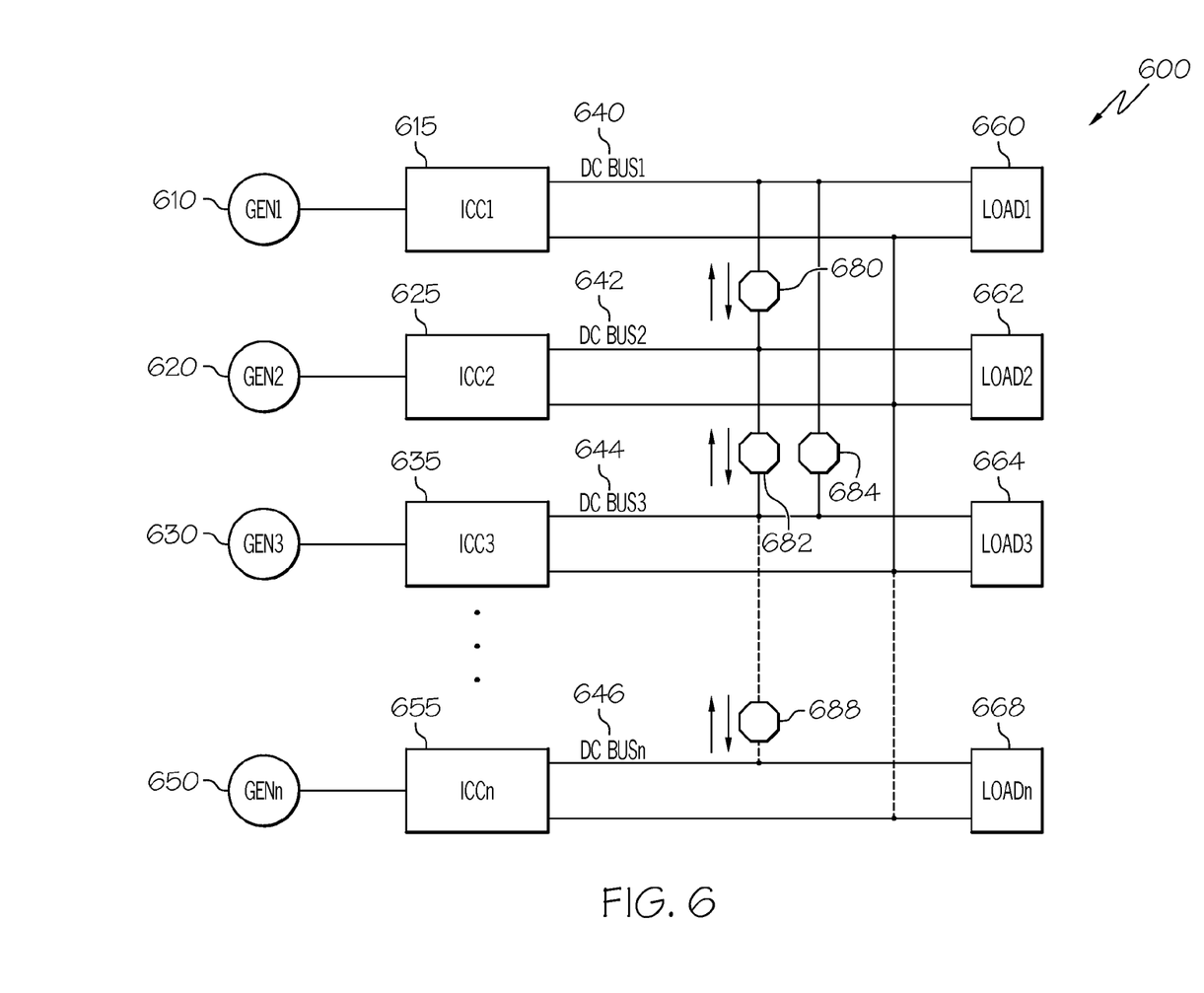
FIG. 6 is an illustration of a system in accordance with another embodiment of the present invention.

Referring to FIG. 6, in another exemplary embodiment, a system 600 may be extended to include a plurality of generators beyond the three generator embodiment of FIG. 3. For example, system 600 is similar to the system 300 shown in FIG. 3 except that this embodiment may include generators 610, 620, 630, and 650 where generator 650 may represent the terminal generator in a plurality of generators and potentially an infinite number of generators may exist between generator 610 and generator 650. It will be understood that the system 600 may comprise any combination of connected main engine and auxiliary generators and for illustrative purposes, each of the generators depicted may serve either role depending on the application for which the system 600 is employed. Each of generators 610, 620, 630 and on through 650 are connected to respective ICCs 615, 625, 635 and on through to ICC 655. Similarly, DC buses 640, 642, 644 and on through DC bus 646 are connected to respective ICC units. A plurality of electrical gates 680, 682, 684 and on through 688 are connected between the DC buses 640, 642, 644, and 646 and loads 660, 662, 664 and on through load 668. It will be understood that the electrical gates 680, 682, 684 and on through 688 may be assembled to create a matrix of controllable power devices serving any combination of uni-directional or bi-directional functions. The electrical gates 680, 682, 684 and on through 688 may be, for example, a diode under a uni-directional operation. In a bi-directional operation, they may be, for example, a power semi-conductor switch.

Thus, it may be appreciated that the operation of the system 600 may include both passive power management and active power switching. In one exemplary embodiment of the system 600, generator 630 may be the auxiliary generator similar to the auxiliary generator 320 shown in FIG. 3. Generators 620 and 650 may be main engine generators similar to the main engine generators 310a and 310b shown in FIG. 3. In one exemplary operation, an increased peak demand for power on load 662 may be insufficiently served by main engine generators 620 and 650. Thus, similar to the operation in system 300, the auxiliary generator 630 in system 600 may switch from an idle state to an active state and provide a supplemental power to and through its ICC 635 for conduction through dc bus 644. When the electrical gates 680, 682, and 688 are operated as uni-directional devices, then the supplemental power may be controlled to transfer only to the load 662. Thus, in this respect, the electrical gates 680 and 688 may serve as protective devices preventing unwanted supplemental power from reaching loads such as loads 660 and 668.

In another exemplary operation of the system 600, some of the electrical gates (680, 682, 684 and on through 688) may be employed in a combination permitting regenerated power from a load to any other main engine generator where desired. For example, electrical gates 682 and 688 may be bi-directional power devices and electrical gates 680 and 684 may be uni-directional semi-conductor devices. In an exemplary event where the load 668 may regenerate power back into the system 600, the regenerated power may be controlled to be absorbed by, for example, the main engine generator 620. In one illustrative operation, the bi-directional device (electrical gate) 688 may be controlled to actively switch on and off so that regenerated power from the load 668 may either flow through the bi-directional device onto the main engine generator 650 or may by-pass the main engine generator 650 and be re-routed to flow toward the electrical gate 682. Re-routed regenerated power may thus be allowed to pass through the bi-directional device (electrical gate) 682 and onto the ICC 625 and main engine generator 620. In this exemplary scenario, it may be appreciated that using uni-directional devices for electrical gates 680 and 684 may help prevent regenerated power from being absorbed, for example, by a main engine generator 610.

It should be understood, of course, that the foregoing relates to exemplary embodiments of the invention and that modifications may be made without departing from the spirit and scope of the invention as set forth in the following claims.

We claim:

1. An electrical system, comprising:
   a first main engine generator for providing steady state and transient power;
   a first inverter/converter controller connected to the first main engine generator for converting power from the first main engine generator;
   a first load for receiving the first main engine generator power;
   an auxiliary generator activated for parallel operation in connection with the first main engine generator during transient power demands from the electrical system, the auxiliary generator providing a supplemental power to the electrical system;
   a supplemental inverter/converter controller connected to the auxiliary generator for converting the supplemental power into a supplemental current and for supplying the supplemental current to augment the first main engine generator power; and
   a first diode connected between the supplemental inverter/converter controller and the first load for transferring the supplemental current supplied to the load.

2. The electrical system of claim 1, further comprising a first main bus for receiving the main engine generator power and transferring the main engine generator power to the first load.

3. The electrical system of claim 2, further comprising an auxiliary bus connected to the auxiliary generator for routing the supplemental power to the first main bus.

4. The electrical system of claim 1, further comprising:
   a second main engine generator connected for parallel operation with the auxiliary generator, for providing steady state and transient power;
   a second inverter/converter controller for converting power from the second main engine generator; and
   a second load for receiving the second main engine power supplemented by the supplemental power.

5. The electrical system of claim 1, wherein the auxiliary generator is part of a power and thermal management system or auxiliary power unit.

6. An electrical system, comprising:
   a plurality of main engine generators operating independently of one another for providing steady state and transient power;
   a plurality of inverter/converter controllers connected respectively to the plurality of main engine generators for converting power from respective main engine generators;
   a plurality of loads for receiving respective main engine generator power and for providing a regeneration current back to respective main engine generators;
   an auxiliary generator activated for parallel operation in connection with the main engine generators, the auxiliary generator providing a supplemental power to the electrical system;
   a supplemental inverter/converter controller connected to the auxiliary generator for converting the supplemental power into a supplemental current and for supplying the supplemental current to augment main engine generator power; and
   a plurality of electrical gates connected between the supplemental inverter/converter controller and the plurality of loads for controlling a flow of regenerated current.

7. The electrical system of claim 6, further comprising a plurality of main buses connected respectively to the main engine generators and for receiving respective main engine generator power and transferring respective main engine generator power to respective loads.

8. The electrical system of claim 7, wherein the main buses further receive regenerated power from respective loads for transfer to respective main engine generators.

9. The electrical system of claim 7, wherein a first main bus receives regenerated power from a first load for transfer through a pair of bi-directional power devices to a second main engine generator.

10. The electrical system of claim 6, wherein the electrical gates include a combination of uni-directional and bi-directional power devices for controlling the flow of steady state, transient, and supplemental power in the system.

11. The electrical system of claim 6, wherein the loads are ancillary loads.

12. A method of providing increased peak power capability in an electrical system of a machine, comprising:
   checking the electrical system for increases in motoring current of the machine;
   checking for increased power demands in the electrical system during the increase in motoring current;
   checking for insufficient power transferred to a first load during the increased power demand;
   activating an auxiliary generator to operate in parallel with a first main engine generator wherein the first main engine generator is connected to a first inverter/converter controller for converting a first main engine generator power into a first main engine power for transfer to the first load;
   transferring a supplemental power from the auxiliary generator to a supplemental inverter/converter controller;
   converting the supplemental power into a supplemental current for transfer to the first load;
   transferring the supplemental current to a main bus for supplementing the main engine generator power to meet the increased power demand;
   transferring the supplemented main engine generator power to the first load;
   operating a second main engine generator in parallel with the auxiliary generator for powering a second load independently of the first main engine generator;
   converting the power received from the second main engine generator to a second current for transfer to the second load; and
   regulating the flow of the supplemental current to one of the first or second loads by employing a pair of diodes connected between the supplemental inverter/converter controller and the first and second loads.

13. The method of claim 12 wherein the auxiliary generator is part of a power and thermal management system or an auxiliary power unit.

14. The method of claim 12 further comprising routing the supplemental current through an auxiliary bus prior to transfer to the main bus.

15. The method of claim 12 further comprising powering an actuator using the supplemented main engine generator power.

16. The method of claim 12 further comprising:
generating a regeneration power from the first load;
receiving the regeneration power on the first inverter/converter controller; and
converting the regeneration power into a converted power for use by the first main engine generator.

17. The method of claim 16 further comprising employing a bi-directional power device for allowing the regeneration power to bypass the first main engine generator and the auxiliary generator for receipt of the regeneration power by the second main engine generator.

* * * * *